(12) United States Patent
Hoang (10) Patent No.: US 9,347,571 B2
(45) Date of Patent: May 24, 2016

(54) DIVERTER VALVE

(71) Applicant: Cameron International Corporation, Houston, TX (US)

(72) Inventor: Loc Gia Hoang, Houston, TX (US)

(73) Assignee: Cameron International Corporation, Houston, TX (US)

( * ) Notice: Subject to any disclaimer, the term of this patent is extended or adjusted under 35 U.S.C. 154(b) by 142 days.

(21) Appl. No.: 13/975,311

(22) Filed: Aug. 24, 2013

(65) Prior Publication Data

US 2014/0053932 A1 Feb. 27, 2014

Related U.S. Application Data

(63) Continuation of application No. 12/515,531, filed as application No. PCT/US2007/087234 on Dec. 12, 2007, now abandoned.

(60) Provisional application No. 60/874,429, filed on Dec. 12, 2006.

(51) Int. Cl.
*F16K 11/07* (2006.01)
*F16K 11/085* (2006.01)

(52) U.S. Cl.
CPC ......... *F16K 11/0716* (2013.01); *F16K 11/0856* (2013.01); *Y10T 137/86879* (2015.04)

(58) Field of Classification Search
CPC ...... B65G 53/56; F16K 11/0716; F16L 55/26
USPC .......... 137/625.48, 874; 406/182; 14/104.061
See application file for complete search history.

(56) References Cited

U.S. PATENT DOCUMENTS

| 431,699 | A | * | 7/1890 | Leake | 406/1 |
| 1,308,369 | A | * | 7/1919 | Renkin | 406/120 |

(Continued)

FOREIGN PATENT DOCUMENTS

| JP | 2001193853 | | 7/2001 |
| JP | 2001193856 | | 7/2001 |
| WO | WO 2004063063 A1 | * | 7/2004 ............. B65G 53/56 |

OTHER PUBLICATIONS

PCT International Search Report and Written Opinion for PCT/US2007/087234, dated Apr. 15, 2008.

*Primary Examiner* — John Fox
(74) *Attorney, Agent, or Firm* — Fletcher Yoder P.C.

(57) ABSTRACT

Provided is a diverter valve including a housing assembly having a plurality of ports and a drum assembly disposed in the housing. The drum assembly including a plurality of passages for selectively coupling the ports, wherein an axial position of the drum assembly with respect to the ports determines which ports are active and which parts are dormant. Further provided is a method of operating a diverter valve, including disposing a drum of the diverter valve in a first position, wherein the first position is configured to provide a first passage from an inlet of the diverter valve to a first outlet of the diverter valve, the first passage comprising a first bend-pipe extending crosswise to an axis of the drum and comprising a first radius of curvature that is at least five times an internal diameter of the first bend-pipe, and moving the drum along the longitudinal axis through the diverter valve to a second position, wherein the second position is configured to provide a second passage from the inlet of the diverter valve to a second outlet of the diverter valve, the second passage comprising a second bend-pipe extending crosswise to the axis of the drum and comprising a second radius of curvature that is at least five times an internal diameter of the second bend-pipe.

36 Claims, 8 Drawing Sheets

(56) References Cited

U.S. PATENT DOCUMENTS

| | | | |
|---|---|---|---|
| 2,154,945 A * | 4/1939 | Kyes | 137/887 |
| 2,639,196 A | 5/1953 | Glaze | |
| 2,752,944 A * | 7/1956 | Temple | 137/554 |
| 2,991,803 A | 7/1961 | Tevis | |
| 3,174,806 A | 3/1965 | Barber et al. | |
| 3,780,756 A | 12/1973 | Pennington | |
| 3,902,682 A * | 9/1975 | Woll | 406/182 |
| 4,133,418 A | 1/1979 | Van Bilderbeek | |
| 4,291,724 A | 9/1981 | Miller | |
| 4,450,867 A | 5/1984 | Moore | |
| 5,060,694 A * | 10/1991 | Florida | F16K 11/065 137/625.18 |
| 5,226,759 A | 7/1993 | Hilmer et al. | |
| 5,611,647 A * | 3/1997 | Ouellette | 406/88 |
| 6,206,043 B1 | 3/2001 | Griswold et al. | |

* cited by examiner

DIVERTER VALVE

CROSS-REFERENCES TO RELATED APPLICATIONS

This application claims priority to and benefit of U.S. Non-Provisional patent application Ser. No. 12/515,531, entitled "Diverter Valve", filed on May 19, 2009, which is herein incorporated by reference in its entirety, and which claims priority to and benefit of PCT Application No. PCT/US07/87234 entitled "Diverter Valve", filed on Dec. 12, 2007, which is herein incorporated by reference in its entirety, and which claims priority to and benefit of U.S. Provisional Patent Application No. 60/874,429, entitled "Diverter Valve", filed on Dec. 12, 2006, which is herein incorporated by reference in its entirety.

BACKGROUND

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art In accordance with certain embodiments, the present invention relates to devices and methods for directing the flow of fluid between different fluid pathways of a fluidic circuit. For example, the present invention provides a diverter valve that manages the activity and use of various fluid pathways within a given fluidic circuit for use in the production of hydrocarbons, such as petroleum and natural gas.

During hydrocarbon production, a series of discrete wells can be connected to a single floating vessel through a series of interconnecting fluidic pathways of a larger fluidic circuit. From time to time, it may be desirable to manage the fluid pathways between the individual wells and the single platform by isolating certain fluid pathways while allowing access to other fluid pathways. This management can be effectuated via one or more diverter valves that act as gatekeepers within the circuit, thus directing the fluid flow between the wells and the floating vessel.

To insure the integrity of the fluidic circuit, inspection of the structural components of the fluidic circuit is often conducted by what is known in the industry as a "pig." These pigs travel through the various fluid pathways, using known testing methodology (e.g., ultrasound, electromagnetic feedback, visual inspection, etc.) to transmit information regarding the structural integrity of the piping defining the fluid pathways to an operator.

Generally, these pigs are flexible devices and can accommodate bends or turns within the various fluid pathways. However, this flexibility is not without limit Traditional pigs have a flexibility that is limited to five times the diameter of the pipe they traverse. That is, pigs can accommodate a radius of curvature (bend in the flow pathway's piping) that is equal to or greater than five times the diameter of the pipe the pig is traversing. This dimensioning requirement is often referenced in the petroleum industry as the "5D" requirement.

To accommodate this 5D requirement, present diverter valves are designed larger than is necessary for managing the fluid flowing therethrough. This increased design leads to increased costs, weight, and manufacturing times, all of which may be undesirable.

The present invention, therefore, provides advantages and potential solutions to certain of these traditional concerns.

DETAILED DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Moreover, the use of "top," "bottom," "above," "below," "left," "right," and variations of these terms is made for convenience, but does not require any particular orientation of the components.

As discussed in detail below, certain embodiments of the present invention provide novel diverter valves and diverter valve drum designs that are believed to be beneficial to the production of petroleum and natural gas from subsea environments, for instance. For example, one embodiment of the present invention provides a diverter-valve drum in which the fluid pathways are defined by curved pipes disposed at positions offset with respect to a central axis of the drum. Advantageously, this offset design facilitates a so-called 5D radius of curvature while concurrently limiting the overall dimensioning of the assembly. As another example, the present invention provides a diverter-valve drum that includes a bifurcated passageway that expands one inlet into two outlets or merges two inlets into one outlet, depending on the direction of fluid flow. A further example of a drum provided by the present invention comprises an arcuate recessed portion that defines a peripheral surface of the drum. Advantageously, employing a peripheral surface of the drum to direct fluid flow provides manufacturing efficiencies that may translate into cost savings and may provide greater structural rigidity. Of course, the foregoing embodiments are merely examples of the scope of the present invention, which is delineated further below. Indeed, although the following discussion focuses on subsea applications, the present invention is applicable to any number of environments where the management of fluid flow is a concern, including surface and industrial applications, for instance.

Figure 1:
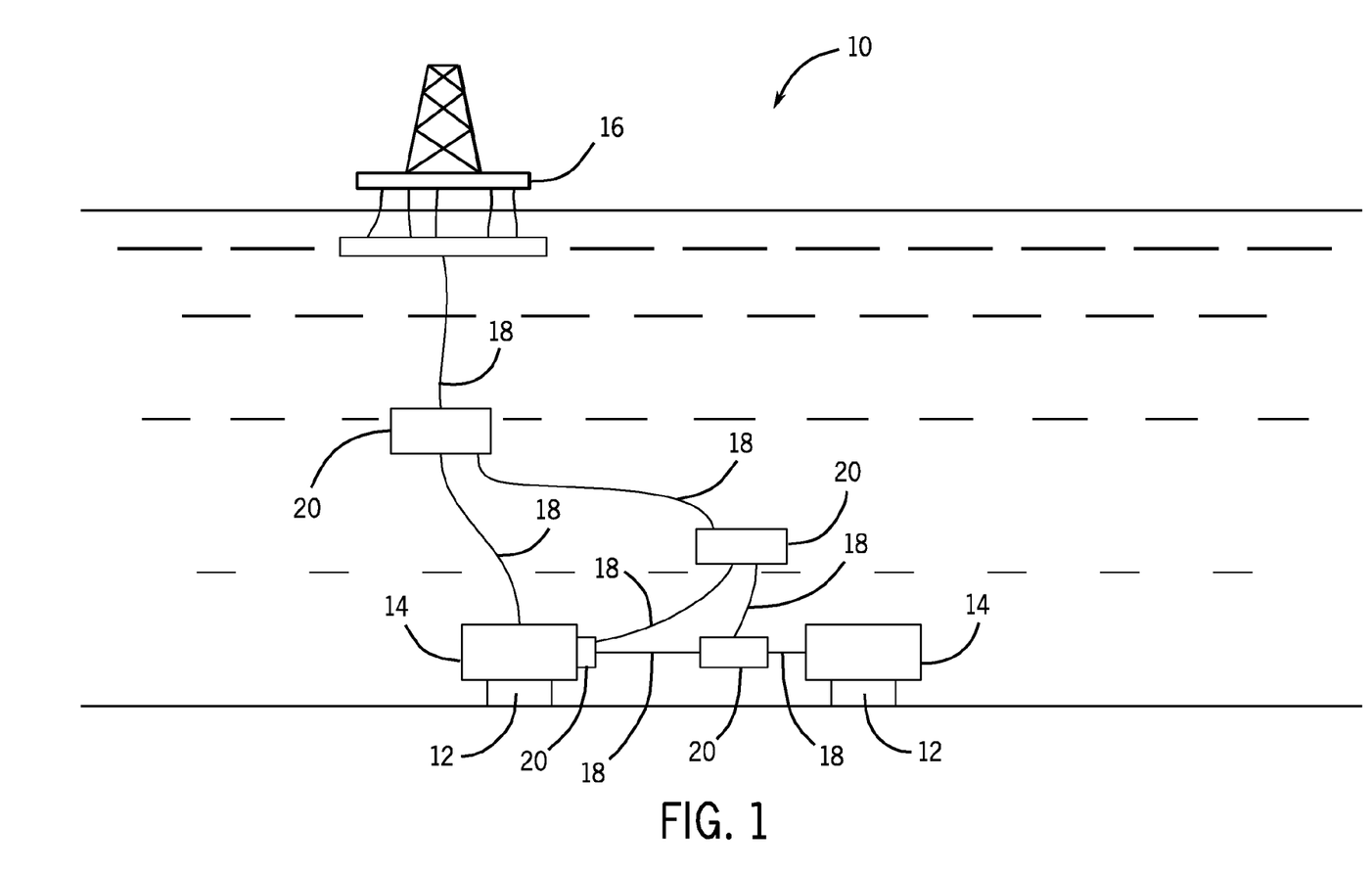
FIG. 1 is a schematic representation of a subsea hydrocarbon-production system.

Turning to the figures, FIG. 1 illustrates an exemplary subsea hydrocarbon production system 10. As illustrated, this system 10 comprises a number of wells 12 disposed on the seafloor. Each well 12 has a "Christmas tree" 14 that controls the production of hydrocarbons from a subterranean formation. These trees 14 also direct the produced hydrocarbons up to a surface vessel 16 floating on the sea surface. Although only one vessel 16 is illustrated, the present invention is applicable to systems in which a plurality of vessels are connected to a plurality of wells or where a plurality of vessels are connected to a single well or any combination thereof. Various riser and casing structures 18 (i.e., piping) define the fluid pathways between the surface vessel 16 and the production trees 14. Indeed, the illustrated elements of FIG. 1 cooperate to provide a fluidic circuit through which hydrocarbons may be produced, testing equipment may travel, and well stimulation and terminating fluids may be provided, for instance.

To manage operation of the various segments of this fluidic circuit, the illustrated system 10 includes diverter valves 20 that couple segments of riser and casing structures 18 to one another. These valves 20 control and manage access to the various segments of the fluidic circuit, by selectively opening and closing various fluid pathways. Although the diverter valves 20 are illustrated as being disposed between the sea vessel 16 and the trees 14, these valves 20 may be located at any point on the fluidic circuit, and may further be located directly on or integrated within the trees 14 or surface vessel 16, for example.

Figure 2:
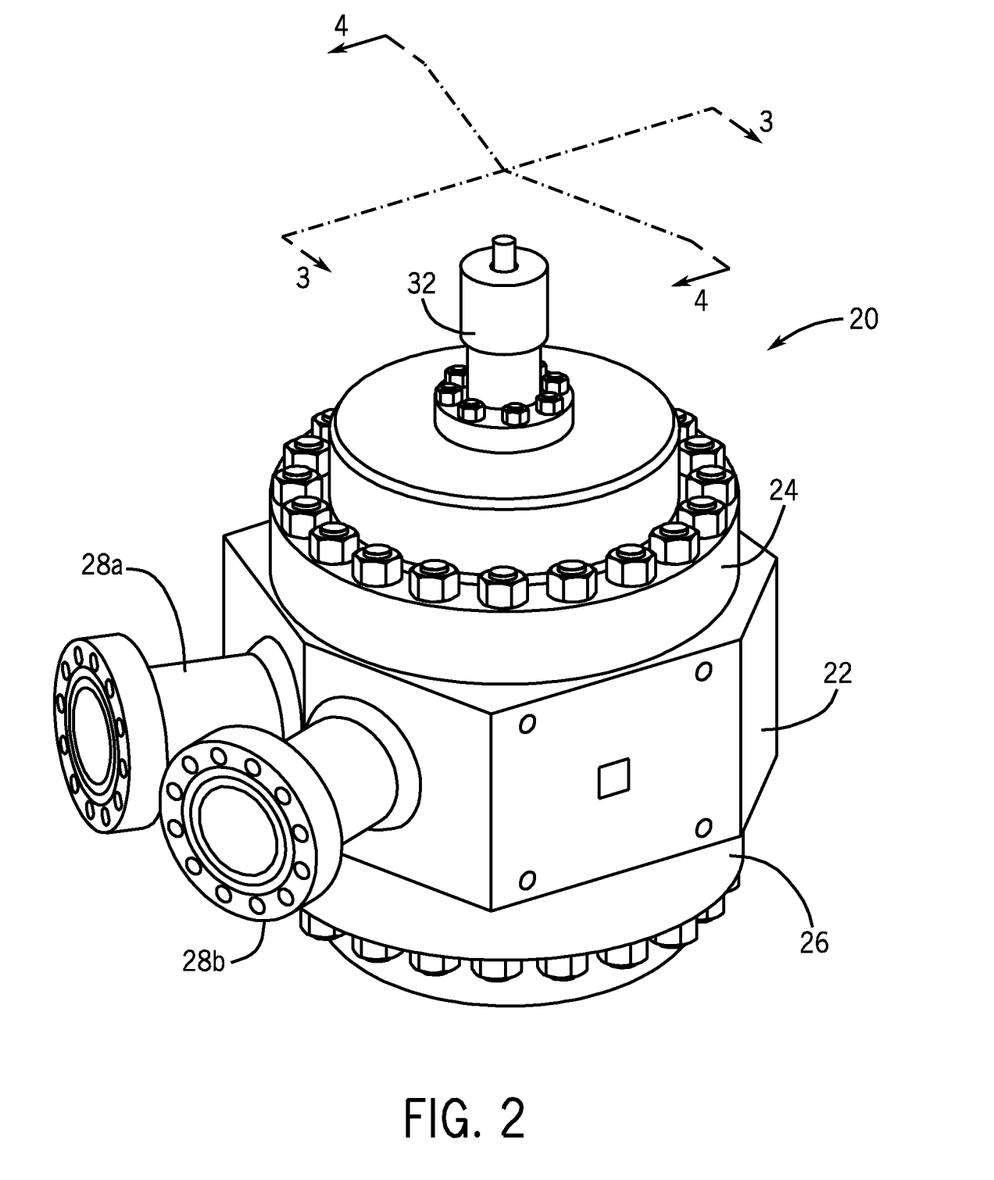
FIG. 2 is an isometric representation of a diverter valve assembly, in accordance with an embodiment of the present invention.

FIG. 2 illustrates an exemplary embodiment of a diverter valve 20 isometrically. The exemplary valve 20 includes a body portion 22 disposed between end caps 24 and 26. The valve 20 also includes a pair of male ports 28a and 28b that extend from the body 22 (for this discussion, the leftmost port of FIG. 2 is port 28a and the rightmost port of FIG. 2 is 28b). Opposite these ports 28a and 28b, the body 22 also includes a female port 30 (see FIG. 3). Of course, it can be seen that the direction of fluid flow defines which of ports 28a, 28b, and 30 is the inlet and which is the outlet. Furthermore, it is worth noting that the gender of the ports 28 and 30 is interchangeable, with either or both being male or female or any combination thereof.

To manage transition of the diverter valve 20 between operational states that control the direction of flow therethrough (as discussed in further detail below), the valve 20 includes an operation stem 32 extending from the upper end cap 24. This operation stem 32 can be configured to mate with the stab of a remote operated vehicle (ROV), or can be configured to operate in response to electrical or hydraulic commands, for example.

Figure 3:
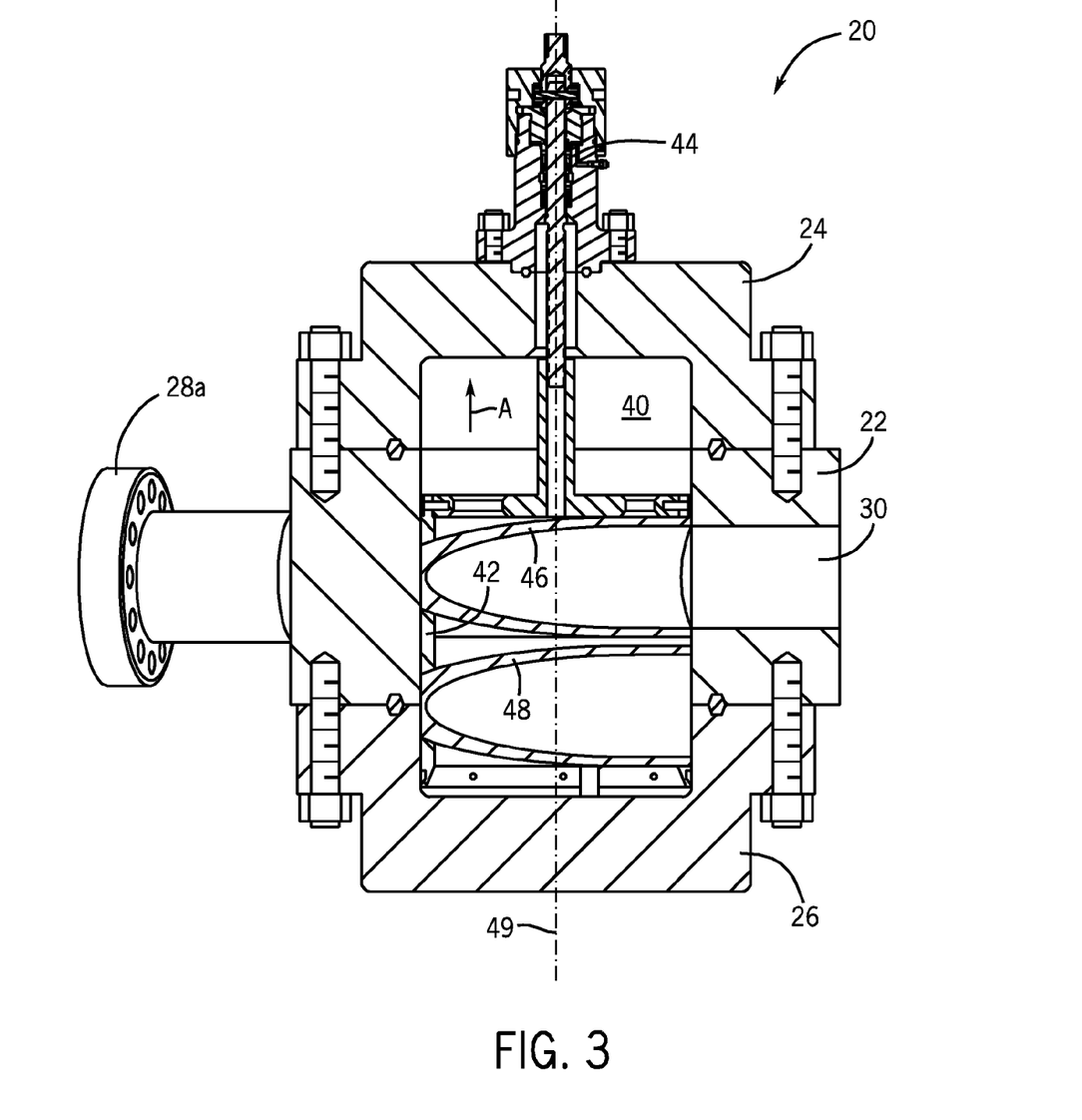
FIG. 3 is a cross-section of the diverter valve assembly of FIG. 2 along line 3-3 in FIG. 2.

FIG. 3 illustrates the flow control mechanism within the exemplary diverter valve 20. As illustrated, the body 22 and end caps 24 and 26 define a cavity 40 that supports a drum 42. The drum 42 is connected to an actuation mechanism 44 located within the operational stem 32. The actuation mechanism 44 may include an electrical motor, a hydraulic assembly, and/or a gearing assembly to translate rotational motion into linear motion. Activation of the actuation mechanism 44 defines the position of the drum 42, which, in turn, defines the fluid pathway through which fluid flows. Moreover, this or other embodiments of the present invention may include one or more position sensors configured to determine the position of the drum 42 within the cavity 40, for instance.

For example, if port 30 were an inlet or upstream portion of the diverter valve 20, then, in the illustrated position of the drum 42, fluid flow would be directed from the inlet port 30, through a first bend-pipe 46, and, ultimately, into the leftmost (with respect to FIG. 2) outlet port 28a. Upon actuation of the actuation mechanism 44, the drum 42 could be raised axially (arrow A) to a second position, such that inlet port 30 aligns with second bend-pipe 48. In this position, fluid flow would be from the inlet port 30, into second bend-pipe 48, and, ultimately, out the rightmost (with respect to FIG. 2) outlet port 28b. The drum 42 and bend-pips 46 and 48 may be manufactured individually and assembled or cast as a single assembly, for example.

Figure 4:
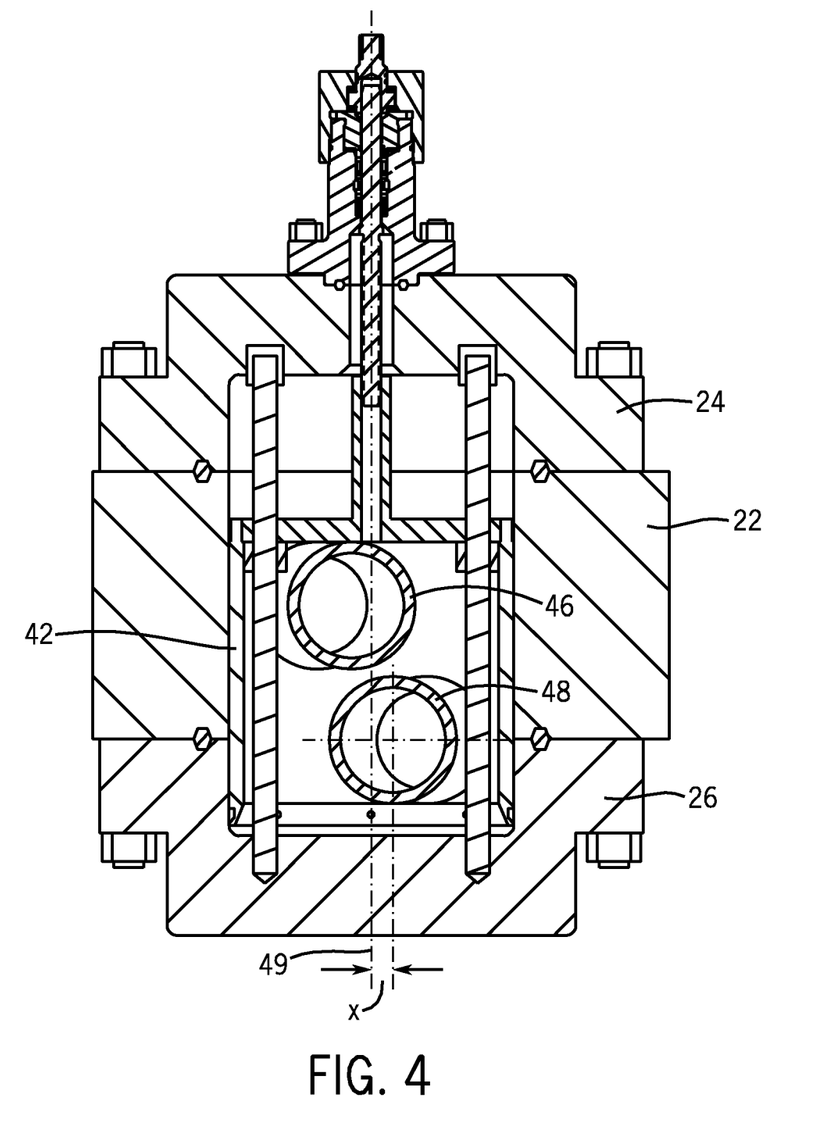
FIG. 4 is a cross-section of the diverter valve assembly of FIG. 2 along line 4-4 in FIG. 2.
Figure 5:
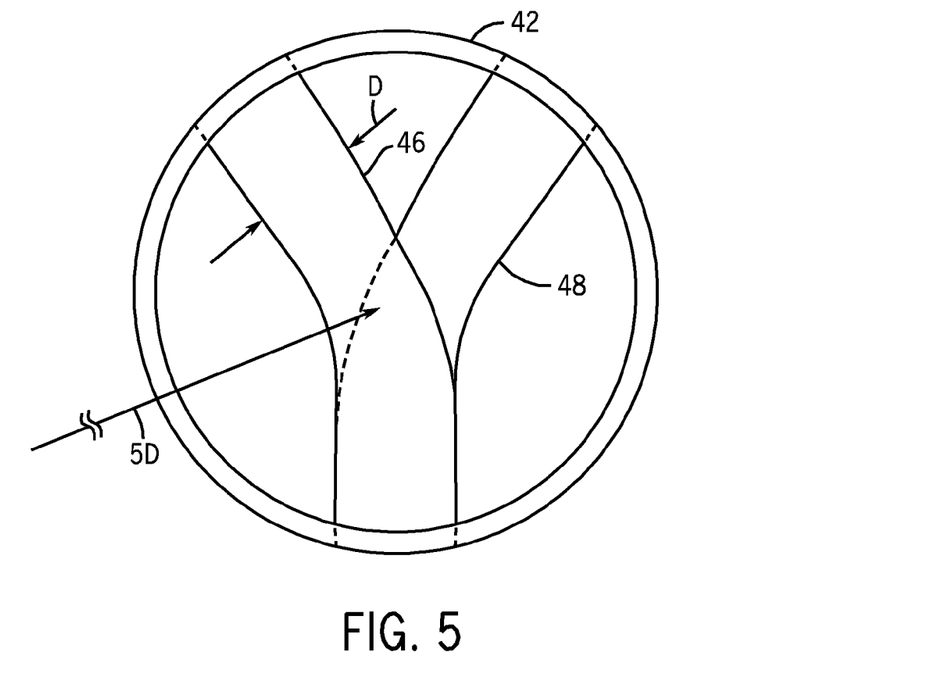
FIG. 5 is a schematic, top view of a drum of a diverter valve assembly, in accordance with an embodiment of the present invention.

To facilitate the change between outlets while maintaining a sufficient radius of curvature for the bend, FIGS. 4 and 5 illustrate that the bends 46 and 48 are offset with respect to a centerline 49 of the drum 42 by a given distance (represented by "X"). Thus, by way of example, an appropriately sized pig requiring a 5D bend may pass through either bend 46 or 48 of the diverter 20 without difficulty. Moreover, offsetting the bend-pipes allows a smaller dimensional assembled in comparison to a "5D" compliant design in which the bend-pipes are centered. The bend-pipes 46 and 48 may be offset at different distances or not. Moreover, in certain instances, only one of the bend-pipes may be offset.

Figure 6:
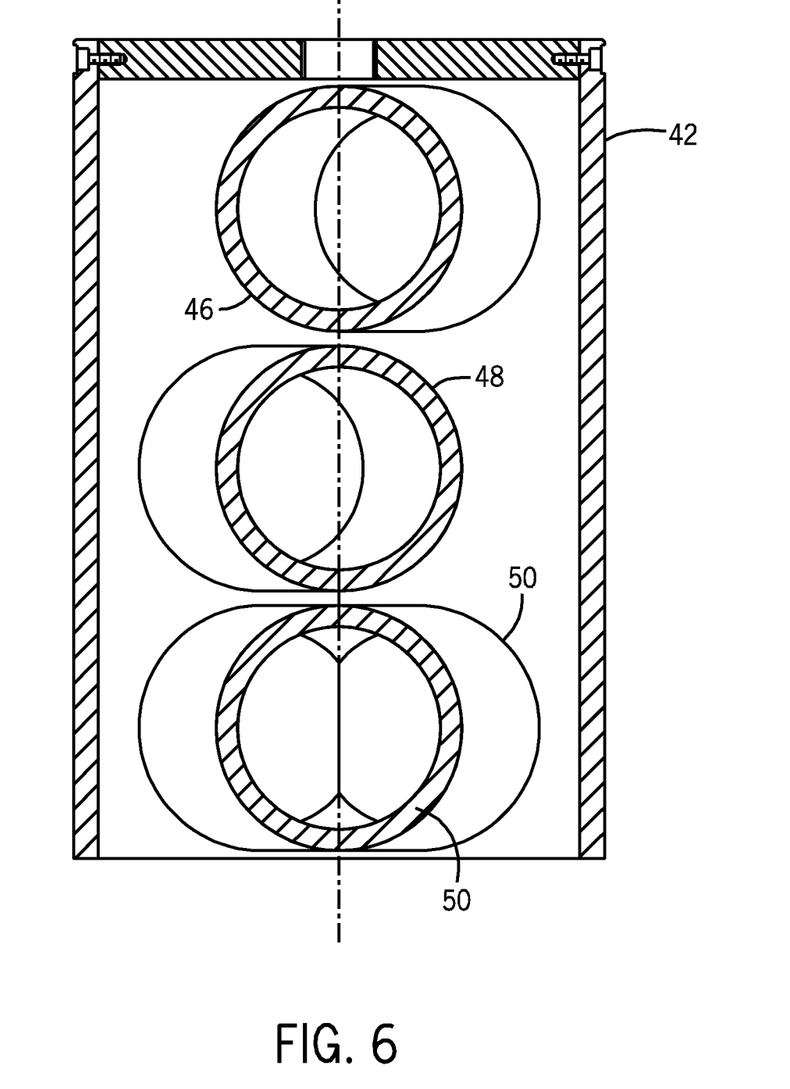
FIG. 6 is a schematic representation of a drum for a diverter valve assembly, in accordance with an embodiment of the present invention.
Figure 7:
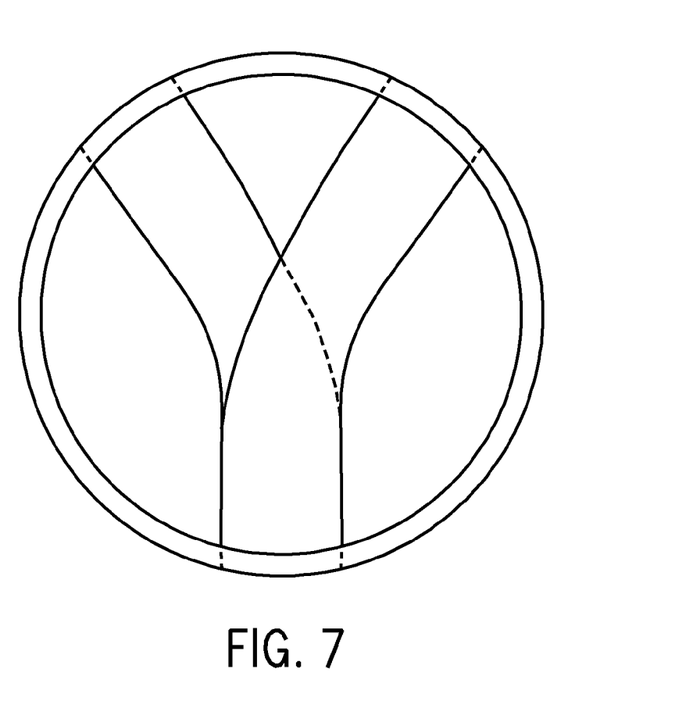
FIG. 7 is a schematic top view representation of a drum for diverter valve assembly, in accordance with an embodiment of the present invention.
Figure 8:
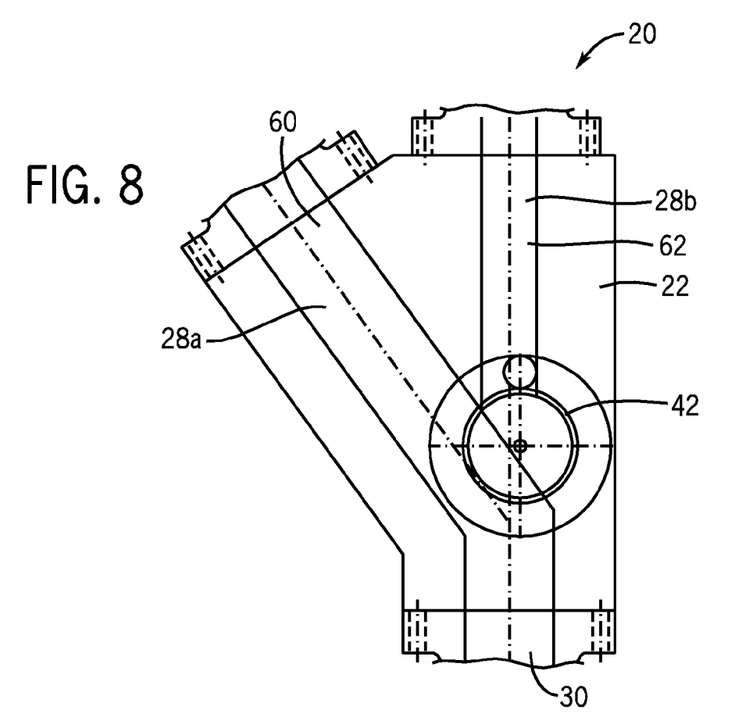
FIG. 8 is a schematic cross-section of a diverter valve assembly, in accordance with an embodiment of the present invention.
Figure 9:
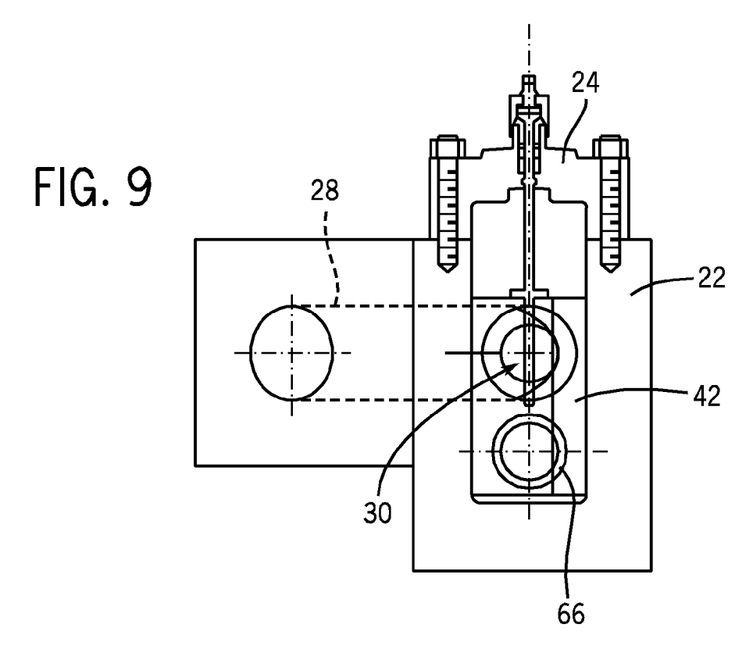
FIG. 9 is a schematic representation of the diverter valve of FIG. 8, with the drum in position to facilitate flow through a first fluid pathway.
Figure 10:
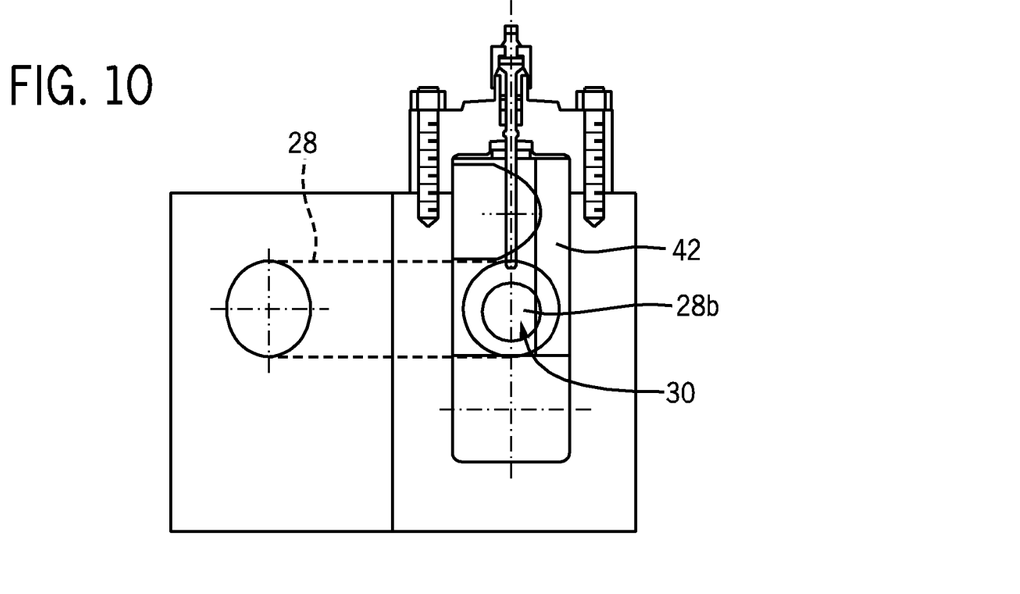
FIG. 10 is a schematic representation of the diverter valve of FIG. 8, with the drum in position to facilitate flow through a second, alternate fluid pathway.
Figure 11:
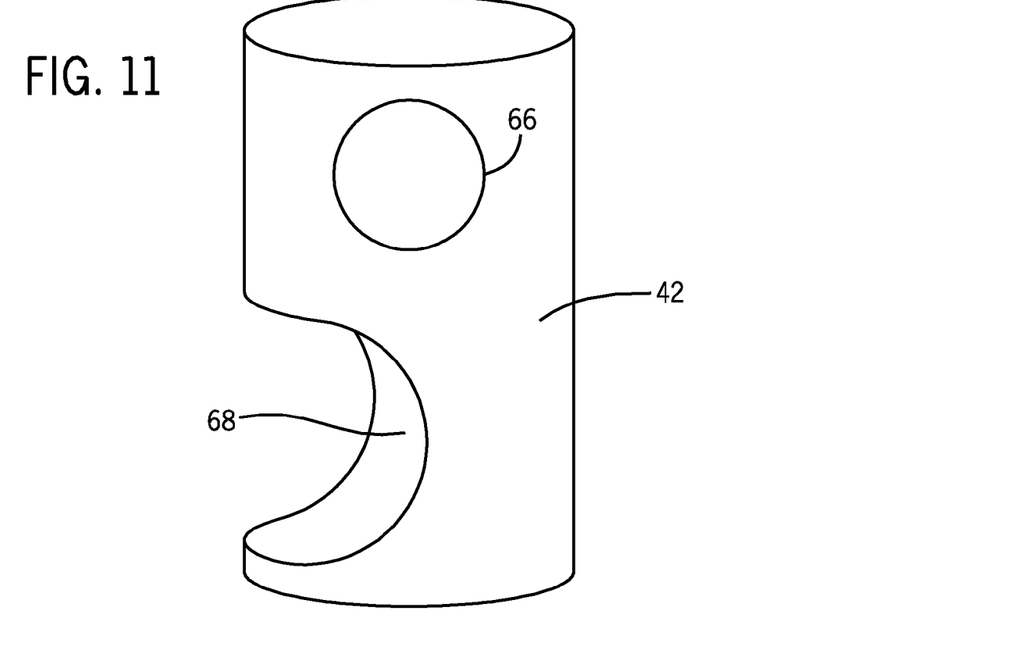
FIG. 11 is a schematic representation of a drum of the diverter valve of FIG. 8.

In certain situations, an operator may desire to have selective functionality between a first flow pathway of the circuit or a second fluid pathway of the circuit, and functionality with both fluid pathways of the circuit. To facilitate this multi-functionality, the drum 42 may include a bifurcated bend-pipe 50 that couples inlet port 30 to both the left outlet port 28a and the right outlet port 28b. This bifurcated bend-pipe 50 may be offset with respect to the drum 42, as illustrated in FIG. 6, or may be aligned with the central axis of the drum 42, as illustrated in FIG. 7. Again, the bend-pipe 50 and/or drum 42 can be manufactured by any number of methodologies, including machining or casting.

FIGS. 8, 9, 10, and 11 illustrate a second exemplary embodiment of the present invention. In this embodiment, the body 22 of the diverter valve 20 provides a first fluid flow path 60 that that egresses at port 28a and at an angle with respect to the inlet port 30. (Again, it is worth noting that the terms inlet and outlet are simply used for purposes of discussion, and that the direction of fluid flow determines which passage or port is the inlet or outlet.) The diverter valve 20 also provides a second and selectable pathway 62 in which the inlet port 30 is co-linear with the secondary outlet 28*b*.

Similar to the above-described embodiments, transitioning between the first and second flow paths is accomplished through axial displacement of the drum 42. Again, this drum 42 may be actuated through an actuation mechanism 44 disposed in the upper end cap 24, for instance. In the schematic illustration of FIG. 9, the drum 42 is shown in the lower position, thus directing the flow of fluid from inlet 30 to leftmost outlet 28*a* (with respect to FIG. 8). However, when the drum 42 is axially displaced to the position illustrated in FIG. 10, the flow of fluid is directed from the inlet 30 to the rightmost passage 28*b*, (again, with respect to FIG. 8).

To accomplish this transition, the drum 42 (see also FIG. 11) comprises a central pipe 66 that facilitates flow through to the linear outlet 28*b*, and also comprises an arcuate peripheral surface 68 that effectuates redirection of the flow at an angle to the inlet 30 and out the leftmost outlet 28*a*. Advantageously, the employment of a peripheral surface for changing the direct of flow reduces certain manufacturing costs and provides for a more robust design. This drum 42 may be assembled by fabrication of the individual parts or may be cast as a single unit.

Again, the above description is illustrative of exemplary embodiments, and many modifications may be made by those skilled in the art without departing from the invention whose scope is to be determined from the literal and equivalent scope of the claims below.

The invention claimed is:

1. A system, comprising:
a fluid flow valve, comprising:
a housing comprising an axis, a first port, a second port, and a third port;
a first bend pipe disposed in the housing, wherein a first flow path through the first bend pipe has a first curvature that extends along a first plane crosswise to the axis, and the first bend pipe is configured to selectively move in an axial direction along the axis between first open and closed positions relative to the first and second ports, wherein the first bend pipe has a first radius of curvature that is at least five times a first diameter of the first bend pipe; and
a second bend pipe disposed in the housing, wherein a second flow path through the second bend pipe has a second curvature that extends along a second plane crosswise to the axis, and the second bend pipe is configured to selectively move in an axial direction along the axis between second open and closed positions relative to the first and third ports, wherein the second bend pipe has a second radius of curvature that is at least five times a second diameter of the second bend pipe, wherein the fluid flow valve comprises at least one of:
the second bend pipe comprises a first pipe portion that splits into a second pipe portion and a third pipe portion; or
a third bend pipe disposed in the housing, wherein a third flow path through the third bend pipe has a third curvature that extends along a third plane crosswise to the axis, and the third bend pipe is configured to selectively move in the axial direction along the axis between third open and closed positions relative to the first, second, and third ports, wherein the third bend pipe has a third radius of curvature that is at least five times a third diameter of the third bend pipe.

2. The system of claim 1, wherein the first and second bend pipes are coupled to a drum having a range of motion in the axial direction along the axis within the housing.

3. The system of claim 1, comprising an actuator coupled to the drum, wherein the actuator is configured to drive the drum to move along the range of motion in the axial direction along the axis.

4. The system of claim 3, wherein the actuator comprises an electric motor.

5. The system of claim 3, wherein the actuator comprises a hydraulic actuator.

6. The system of claim 3, comprising one or more position sensors configured to monitor a position of the drum along the range of motion in the axial direction along the axis within the housing.

7. The system of claim 3, wherein the actuator comprises a remote operated vehicle (ROV) interface.

8. The system of claim 2, wherein the drum, the first bend pipe, and the second bend pipe are integrated together as a one-piece structure.

9. The system of claim 2, wherein the first bend pipe is offset by a first offset distance relative to a centerline of the drum.

10. The system of claim 9, wherein the second bend pipe is offset by a second offset distance relative to the centerline of the drum.

11. The system of claim 2, wherein the drum does not support any straight pipes.

12. The system of claim 2, wherein the drum does not support any port valves between the first and second bend pipes and the first, second, and third ports.

13. The system of claim 3, wherein the fluid flow valve comprises the third bend pipe disposed in the housing, wherein the third flow path through the third bend pipe has the third curvature that extends along the third plane crosswise to the axis, and the third bend pipe is configured to selectively move in the axial direction along the axis between third open and closed positions relative to the first, second, and third ports, wherein the third bend pipe has the third radius of curvature that is at least five times the third diameter of the third bend pipe.

14. The system of claim 13, wherein the second bend pipe comprises the first pipe portion that splits into the second pipe portion and the third pipe portion.

15. The system of claim 13, wherein the first, second, and third bend pipes are coupled to a drum having a range of motion in the axial direction along the axis within the housing.

16. The system of claim 1, comprising a liquid source coupled to the fluid flow valve.

17. The system of claim 1, comprising a hydrocarbon production component coupled to the fluid flow valve.

18. The system of claim 1, wherein the fluid flow valve is a subsea fluid flow valve.

19. The system of claim 1, wherein the second bend pipe comprises the first pipe portion that splits into the second pipe portion and the third pipe portion.

20. A system, comprising:
a valve, comprising:
a housing comprising an axis and a plurality of ports;
a first bend pipe disposed in the housing, wherein a first flow path through the first bend pipe has a first curvature that extends along a first plane crosswise to the axis, the first curvature of the first bend pipe has a first radius of curvature that is at least five times a first diameter of the first bend pipe, and the first bend pipe is configured to selectively move in an axial direction along the axis between first open and closed positions relative to a first subset of the plurality of ports;

a second bend pipe disposed in the housing, wherein a second flow path through the second bend pipe has a second curvature that extends along a second plane crosswise to the axis, the second curvature of the second bend pipe has a second radius of curvature that is at least five times a second diameter of the second bend pipe, and the second bend pipe is configured to selectively move in the axial direction along the axis between second open and closed positions relative to a second subset of the plurality of ports; and a third bend pipe disposed in the housing, wherein a third flow path through the third bend pipe has a third curvature that extends along a third plane crosswise to the axis, the third curvature of the third bend pipe has a third radius of curvature that is at least five times a third diameter of the third bend pipe, and the third bend pipe is configured to selectively move in the axial direction along the axis between third open and closed positions relative to a third subset of the plurality of ports.

21. The system of claim 20, wherein the first, second, and third bend pipes are coupled to a drum having a range of motion in the axial direction along the axis within the housing.

22. The system of claim 20, comprising a liquid source coupled to the valve.

23. The system of claim 20, wherein the third bend pipe comprises a first pipe portion that splits into a second pipe portion and a third pipe portion.

24. The system of claim 20, comprising a hydrocarbon production component coupled to the valve.

25. A system, comprising:
  a valve, comprising:
    a housing comprising a first port, a second port, and a third port;
    a first bend pipe disposed in the housing, wherein the first bend pipe is configured to selectively move between first open and closed positions relative to the first and second ports, wherein the first bend pipe has a first radius of curvature that is at least five times a first diameter of the first bend pipe; and
    a second bend pipe disposed in the housing, wherein the second bend pipe is configured to selectively move between second open and closed positions relative to the first and third ports, wherein the second bend pipe has a second radius of curvature that is at least five times a second diameter of the second bend pipe, wherein the second bend pipe comprises a first pipe portion that splits into a second pipe portion and a third pipe portion.

26. The system of claim 25, comprising a third bend pipe disposed in the housing, wherein the third bend pipe is configured to selectively move between third open and closed positions relative to the first, second, and third ports, wherein the third bend pipe has a third radius of curvature that is at least five times a third diameter of the third bend pipe.

27. The system of claim 25, wherein the valve is a subsea fluid flow valve.

28. The system of claim 25, comprising a liquid source coupled to the valve.

29. The system of claim 25, comprising a hydrocarbon production component coupled to the valve.

30. A system, comprising:
  a valve, comprising:
    a housing comprising an axis and a plurality of ports;
    a first bend pipe disposed in the housing, wherein a first flow path through the first bend pipe has a first curvature that extends along a first plane crosswise to the axis, and the first bend pipe is configured to selectively move in an axial direction along the axis between first open and closed positions relative to a first subset of the plurality of ports;
    a second bend pipe disposed in the housing, wherein a second flow path through the second bend pipe has a second curvature that extends along a second plane crosswise to the axis, and the second bend pipe is configured to selectively move in the axial direction along the axis between second open and closed positions relative to a second subset of the plurality of ports; and
    a third bend pipe disposed in the housing, wherein a third flow path through the third bend pipe has a third curvature that extends along a third plane crosswise to the axis, the third bend pipe is configured to selectively move in the axial direction along the axis between third open and closed positions relative to a third subset of the plurality of ports, and the third bend pipe comprises a first pipe portion that splits into a second pipe portion and a third pipe portion.

31. The system of claim 30, wherein the first curvature of the first bend pipe has a first radius of curvature that is at least five times a first diameter of the first bend pipe.

32. The system of claim 31, wherein the second curvature of the second bend pipe has a second radius of curvature that is at least five times a second diameter of the second bend pipe.

33. The system of claim 32, wherein the third curvature of the third bend pipe has a third radius of curvature that is at least five times a third diameter of the third bend pipe.

34. The system of claim 30, wherein the first, second, and third bend pipes are coupled to a drum having a range of motion in the axial direction along the axis within the housing.

35. The system of claim 30, comprising a liquid source coupled to the valve.

36. The system of claim 30, comprising a hydrocarbon production component coupled to the valve.

* * * * *